3,088,983
CONDITIONING OF ACTIVATED CARBON
Arnold J. Rosenthal, Whippany, N.J., assignor to Celanese Corporation of America, New York, N.Y., a corporation of Delaware
No Drawing. Filed June 17, 1957, Ser. No. 666,223
12 Claims. (Cl. 260—652)

The present invention relates to a conditioning of activated carbon used for the recovery of organic solvent vapors. More particularly, it relates to the conditioning of activated carbon used for the recovery of potentially corrosive vapors such as methylene chloride generated during the spinning into filamentary material of solutions of cellulose esters in methylene chloride.

Cellulose ester solutions are converted into filamentary materials by several different procedures. In dry spinning, a solution of the ester in a volatile solvent is extruded through orifices in a spinning jet into a heated cabinet wherein the solvent is vaporized by hot air to precipitate the cellulose ester in filamentary form. The mixed vapors, air and organic solvent, are collected and treated for recovery of the organic solvent constituents. One conventional procedure for this recovery involves passage of the vapors through a bed of activated carbon whereby the organic solvent vapors are adsorbed. When the adsorptive capacity of the carbon bed is reached, the vapor stream is conducted to another bed and the first bed is steamed to strip the organics, thereby regenerating the carbon bed. The resultant mixture of organic solvent vapors and water vapor is condensed and distilled for recovery of the organic solvents.

It has been found that the vapor mixture resulting from steaming tends to attack and weaken metals contacted therewith so as to damage the recovery equipment, necessitating shutdown for replacement of portions of the apparatus. Weakening due to corrosion is particularly noticed where the organic solvent of the spinning solution, which is adsorbed by and then stripped from the carbon, comprises a halogenated hydrocarbon.

It is accordingly an object of the present invention to treat activated carbon so as to reduce the attack on metal equipment of organic solvent vapors stripped from the carbon.

It is a further object of the invention to condition activated carbon to reduce the corrosiveness of potentially corrosive organic solvent vapors stripped therefrom, which vapors are generated during the dry spinning of organic solvent solutions of filament forming material.

Still another object is to provide a conditioned activated carbon which can be employed for adsorption of potentially corrosive vapors, the vapors being rendered noncorrosive even after the carbon has been used for adsorption and then regenerated a large number of times.

Other objects of this invention will be apparent from the following detailed description and claims.

In accordance with the present invention it has been found that the activated carbon employed for solvent recovery can be conditioned either initially or at infrequent intervals to reduce the corrosiveness of vapors stripped therefrom, the conditioning being effected by depositing in the carbon from a solution an alkaline reacting material which is soluble in water to the extent of less than 1% by weight. Preferably, the alkaline reacting material is a hydroxide, carbonate or bicarbonate of an alkaline earth metal or aluminum. Even better results, in some cases, are realized when this deposit is preceded by treatment of the carbon with gaseous ammonia, preferably followed by washing. Since ammonia might react with some of the solvent vapors, any residual ammonia is removed by steaming the carbon either after the wash or after deposit of the alkaline reacting material of low solubility.

The best results are achieved when the principal conditioning step is effected by contacting the activated carbon with an aqueous solution of the hydroxide, carbonate or bicarbonate of an alkaline earth metal such as calcium, magnesium, barium or strontium. It is believed that upon drying or heating the bicarbonates are decomposed to the carbonates and thus where it is desired to deposit a carbonate, it can generally be effected more readily through contact of the carbon with a solution of the more readily soluble bicarbonate.

The conditioning of the carbon to deposit therein an alkaline reacting compound of low water solubility can also be effected by contacting the carbon with a solution of a salt of one of the indicated metals with an acid anion other than the carbonate or bicarbonate. These salts can then be converted to the hydroxide, carbonate or bicarbonate in situ by reaction with an alkaline material which contains the hydroxide, carbonate or bicarbonate anion and a cation which by metathesis forms a soluble salt with the anion of the initial salt, the soluble salt formed by metathesis then being washed out to leave the alkaline reacting compound of low solubility. This technique is especially useful where the alkaline reacting compound ultimately to be deposited is soluble only to a very small extent, in which event it would otherwise be necessary to employ repeated contacts in order to deposit an appreciable amount of the alkaline reacting compound.

By way of example, the carbon bed can be contacted with an aqueous solution of a salt such as aluminum sulfate which is converted to the hydroxide by treatment with an alkali. The alkali is preferably volatile, i.e. ammonia, forming ammonium hydroxide and ammonium sulfate. The ammonium sulfate can be washed out and any excess alkali can be removed either by washing or preferably by steaming when the alkali is volatile.

While the exact mechanism of the conditioning is not fully understood, it has been found that if the carbon is admixed with a solid carbonate such as magnesium carbonate, the damage to metal equipment by the solvent vapors subsequently stripped from the carbon will not be diminished as in the present invention.

Without wishing to be bound thereby, it is possible that in accordance with the present invention the solutions of metal compounds can penetrate into the microscopic channels of the activated carbon. When the metal compounds are deposited, they are located within these channels. Since the high adsorptive capacity of the activated carbon is due to these numerous microscopic channels, the deposited metal compounds are located throughout the carbon at the exact sites where the organic solvent vapors will be adsorbed, thereby being able to exert their maximum effect on these vapors both during adsorption and stripping.

The hydroxides, carbonates or bicarbonates are deposited in the carbon in an amount between about 0.01 and 1.0% and preferably 0.02 to 0.4% by weight of the carbon. Because of the low water solubility of the alkaline reacting compounds identified herein, the contact of the carbon with the solution is generally effected in several successive stages, as by immersing the carbon in solution for about an hour, drawing off the solution, and repeating the process several times.

The conditionings herein referred to are especially suited for use in the treatment of carbon that is employed for the recovery of methylene chloride used as a solvent in the dry spinning of organic acid esters of cellulose and particularly of cellulose acetates having an acetyl value in excess of about 59% by weight expressed as acetic acid. These acetates which contain less than 0.25 free hydroxy groups per anhydroglucose unit are substantially fully acetylated, and will accordingly hereinafter be referred to as cellulose triacetate. The invention can also be applied, however, to the vapors generated upon spinning solutions of cellulose esters in acetone or in methylene chloride containing up to about 20% by weight of other solvents such as methanol, ethanol, propanol, isopropanol and the like, as well as in other halogenated, e.g. chlorinated, lower alkane solvents such as ethylene dichloride or the like.

The following examples illustrate the practice of the present invention:

EXAMPLE I

A saturated solution of calcium bicarbonate is produced by dissolving calcium oxide in water, then passing in carbon dioxide until the precipitate of calcium carbonate which forms initially redissolves. The solution of calcium bicarbonate is poured over a bed of activated carbon fully to cover the carbon. After one hour the solution is drawn off, increasing the calcium content of the carbon by about 375 parts per million, and a fresh solution applied. After another hour a third wash is applied and also drawn off an hour later, the second and third washes further increasing the calcium content of the carbon by a total of about 600 parts per million. The carbon thus treated is suitable for adsorption of methylene chloride vapors which upon stripping will exhibit reduced corrosiveness.

EXAMPLE II

A 20% by weight solution of cellulose triacetate (acetyl value 61.0%) in a solvent mixture comprising 91% by weight of methylene chloride and 9% by weight of methanol is spun into a spinning chamber supplied with hot air. The cellulose triacetate filaments are drawn onto bobbins in conventional manner and the mixture of solvent vapors and air is passed through a bed of activated carbon. When the carbon approaches the breakthrough point for methanol the vapors are passed into another bed and the first carbon bed is steamed until approximately 3–4 parts of steam have been used per part of adsorbed solvent. The mixture of steam and solvent vapors is condensed for recovery of the organic solvents in conventional manner. Following steaming, the carbon bed is cooled with fresh air until it reaches the inlet temperature. Air in admixture with gaseous ammonia is then passed through the carbon bed until the presence of free ammonia can be detected in the effluent air. The carbon is then subjected to 5 rinses with water at 190° F., the hot water each time being supplied in sufficient amount fully to immerse the carbon bed. The carbon bed is steamed for 24 hours at which time the pH of the condensate of steam passing through the carbon is the same as the pH of condensate from the pure steam fed to the carbon and then subjected to 3 rinses with a saturated solution of calcium hydroxide, the solution in each rinse being applied in sufficient quantity fully to immerse the bed. After the third rinse is drawn off, the carbon bed can be returned to active use for further adsorption of solvent vapors.

EXAMPLE III

Following stripping of solvent vapors from a carbon bed by steaming in the same manner as described in Example II, an 0.25% solution of aluminum sulfate in water is poured over the carbon bed in an amount sufficient fully to immerse the bed. After drawing off the solution, air containing ammonia gas is passed through the bed until the odor of ammonia can be detected in the effluent air. By this process ammonium sulfate and aluminum hydroxide are formed within the carbon. The carbon bed is washed with hot water, thereby dissolving out the ammonium sulfate and the bed is then steamed for 24 hours to remove any free ammonia. The bed can then be returned for use in the adsorption of organic solvent vapors.

EXAMPLE IV

To compare the degree of attack of stainless steel by vapors steam-stripped from activated carbon, a special testing apparatus is employed. The lower end of a 316 stainless steel wire of 0.007 inch diameter is sealed to the inside bottom of a 500 ml. flask provided with a heating jacket. The wire passes through a one inch layer of activated carbon (25 grams) contained in the bottom of the flask, through seven inches of space within the flask, and through a water-cooled reflux condenser. The upper end of the wire is fastened to a lever arm weighted to place a 46,000 p.s.i. tension on the wire. The carbon in the flask is steam-stripped in conventional manner and then subjected to the treatments indicated (in accordance with the procedures of Examples I, II or III). To the flask there is added a mixture of 20 ml. of water and 2 ml. of a 91/9 weight mixture of methylene chloride/methanol. The flask is heated to 105° C. to fill the space with solvent vapors which are condensed by the condenser. The table shows the number of hours required for the stressed wire to break, indicating the relative degree of attack by the solvent vapors, longer periods signifying reduced attack.

*Table*

| Chemical in Wash Water | Stressed Wire Life, Hours (Average) |
| --- | --- |
| None | 97 |
| Magnesium bicarbonate | >484+ |
| Calcium bicarbonate | >540+ |
| Strontium bicarbonate | 111 |
| Barium bicarbonate | >412+ |
| Calcium hydroxide | >240+ |
| Ammonia, then calcium hydroxide | >408+ |
| Strontium hydroxide | 148 |
| Barium hydroxide | >489+ |
| Aluminum hydroxide* | >274+ |

*Applied as aluminum sulfate, treated with ammonia vapor, washed free of sulfate with hot water, steamed free of ammonia.
+=test discontinued before breakage of wire; (where > shown, it means last time wire was checked, it was not broken).

The conditioned activated carbons produced in accordance with the present invention therefore clearly reduce attack of metals by solvent vapors stripped from the carbons. In addition, the treatments herein set forth do not detract from other properties of the carbon. By way of example, where the solvent vapors contain acetone there is but little tendency for the acetone to dimerize to diacetone alcohol in spite of the fact that such dimerization is normally moderately pronounced in the presence of alkali not deposited in activated carbon. Moreover, the materials deposited herein do not materially affect the auto-ignition temperature, i.e. the kindling temperature of the carbon.

The auto-ignition temperature of the carbon is determined by heating at a rate sufficient to raise its temperature 10° C. per minute, while passing therethrough a stream of oxygen or a mixture of 85/15 oxygen/acetone by volume. The carbon can be dry or can initially contain adsorbed acetone, methylene chloride or other solvent of interest. The temperature beyond which the temperature of the carbon rises at the rate of about 100° C. per minute is the auto-ignition temperature. Not only is this temperature not appreciably lowered by treatment of the carbon as herein disclosed, but, as a matter of fact, calcium bicarbonate and particularly strontium bicarbonate effect an increase in the auto-ignition temperature.

It is to be understood that the foregoing detailed description is given merely by way of illustration and that many variations may be made therein without departing from the spirit of my invention.

Having described my invention what I desire to secure by Letters Patent is:

1. The process for the conditioning of a bed of activated carbon which comprises washing the substantially dry carbon bed with an aqueous solution of aluminum sulfate, passing gaseous ammonia through the carbon bed whereby the ammonia dissolves in retained water to form ammonium hydroxide which undergoes double decomposition with the aluminum sulfate to form ammonium sulfate, washing the carbon bed with hot water to remove the ammonium sulfate, and passing steam through the bed to remove any residual ammonia, whereby insoluble aluminum hydroxide is deposited in the carbon.

2. The process for the conditioning of activated carbon which comprises contacting the carbon with gaseous ammonia, and thereafter depositing in the substantially dry carbon from solution an alkaline reacting compound having a solubility in water of less than about 1% by weight.

3. The process for the conditioning of activated carbon which comprises contacting the carbon with gaseous ammonia, and thereafter contacting the carbon substantially dry with an aqueous solution of a compound selected from the group consisting of hydroxides, carbonates and bicarbonates of an alkaline earth metal.

4. In the recovery of organic solvent vapors wherein the organic solvent vapors are adsorbed on activated carbon and steam stripped from the carbon, the improvement which comprises depositing in the carbon from solution an alkaline reacting compound having a solubility in water of less than about 1% by weight.

5. In the recovery of potentially corrosive vapors of chlorinated lower alkanes wherein the vapors are adsorbed on activated carbon and steam stripped from the carbon, the improvement which comprises depositing in the carbon from solution an alkaline reacting compound having a solubility in water of less than about 1% by weight.

6. In the recovery of organic solvent vapors wherein the organic solvent vapors are adsorbed on activated carbon and steam stripped from the carbon, the improvement which comprises depositing in the carbon from solution a compound selected from the group consisting of hydroxides, carbonates and bicarbonates of a metal selected from the group consisting of the alkaline earth metals and aluminum, whereby the solvent vapors subsequently adsorbed on and stripped from the carbon exhibit a reduced degree of attack on metals.

7. In the recovery of organic solvent vapors from the dry spinning of organic solutions of filament forming materials, wherein the organic solvent vapors are passed through a bed of activated carbon for adsorption thereon, and stripped from the carbon by steaming for recovery of adsorbed vapors and regeneration of the carbon, the improvement which comprises contacting the carbon bed with an aqueous solution of a compound selected from the group consisting of hydroxides, carbonates and bicarbonates of an alkaline earth metal, whereby solvent vapors subsequently adsorbed on and stripped from the carbon exhibit a reduced degree of attack on metals.

8. In the recovery of methylene chloride from the dry spinning of a solution of cellulose triacetate in methylene chloride, wherein the methylene chloride is vaporized, passed through a bed of activated carbon for adsorption thereon, and stripped from the carbon by steaming for purification and recovery, the improvement which comprises passing gaseous ammonia through the carbon bed, washing the carbon bed with an aqueous solution of a compound selected from the group consisting of hydroxides, carbonates and bicarbonates of an alkaline earth metal, whereby methylene chloride vapors subsequently adsorbed on and stripped from the carbon exhibit a reduced corrosiveness on metals.

9. The process defined in claim 8, wherein the alkaline earth metal is calcium.

10. The process defined in claim 8, wherein the alkaline earth metal compound is calcium hydroxide.

11. The process for the recovery of potentially corrosive vapors of chlorinated lower alkanes from a gaseous mixture thereof which comprises passing said gaseous mixture through activated carbon having deposited therein from solution an alkaline reacting compound having a solubility in water of less than about 1% by weight, whereby the chlorinated lower alkanes are adsorbed, and thereafter steaming the carbon to strip the chlorinated lower alkanes therefrom, the stripped chlorinated lower alkane vapors exhibiting a reduced degree of attack on metals.

12. The process for the recovery of methylene chloride vapors from a gaseous mixture thereof which comprises passing said gaseous mixture through a bed of activated carbon having deposited therein from solution a compound selected from the group consisting of hydroxides, carbonates and bicarbonates of a metal selected from the group consisting of the alkaline earth metals and aluminum, whereby the methylene chloride vapors are adsorbed, and thereafter steaming the carbon to strip the methylene chloride therefrom, the stripped methylene chloride vapors exhibiting a reduced degree of attack on metals.

References Cited in the file of this patent

UNITED STATES PATENTS

| Number | Name | Date |
|---|---|---|
| 1,789,194 | Rockwell | Jan. 13, 1931 |
| 2,221,952 | Pier et al. | Nov. 19, 1940 |
| 2,330,051 | Heidt | Sept. 21, 1943 |
| 2,481,300 | Engel | Sept. 6, 1949 |
| 2,537,448 | Engel | Jan. 9, 1951 |
| 2,577,824 | Stine | Dec. 11, 1951 |
| 2,746,936 | Plank | Mar. 22, 1956 |
| 2,748,059 | Nixon et al. | May 29, 1956 |
| 2,779,712 | Stine | Jan. 29, 1957 |
| 2,818,133 | Rosenthal | Dec. 31, 1957 |

FOREIGN PATENTS

| Number | Country | Date |
|---|---|---|
| 598,043 | Great Britain | Feb. 9, 1948 |